United States Patent [19]
Böttger et al.

[11] Patent Number: 6,105,316
[45] Date of Patent: Aug. 22, 2000

[54] DEVICE FOR SUPPORTING SOLAR PANEL AND A SOLAR PANEL ASSEMBLY COMPRISING THIS DEVICE

[75] Inventors: Willem Otto Julius Böttger, Amsterdam; Antonius Bernardus Schaap, Hilversum; Klaas Jetze Hoekstra, Swifterbant; Antonius Joseph Nicolaas Schoen, Utrecht, all of Netherlands

[73] Assignee: Cooperatief Advies en Onderzoeksburo u.a. Ecofys, Utrech, Netherlands

[21] Appl. No.: 09/112,578

[22] Filed: Jul. 9, 1998

[51] Int. Cl.[7] .................................................... F24J 2/36
[52] U.S. Cl. ......................... 52/173.3; 52/173.1; 52/27; 52/741.1; 126/623; 248/148
[58] Field of Search ....................... 52/173.3, 173.1, 52/27, 741.1; 126/704, 623, 621; 220/780, 781, 675, 671, 631, 608; 248/237, 148

[56] References Cited

U.S. PATENT DOCUMENTS

| | | |
|---|---|---|
| 4,058,111 | 11/1977 | Wendel . |
| 4,226,256 | 10/1980 | Hawley .............................. 126/704 X |
| 4,306,544 | 12/1981 | Clemens ............................ 126/704 X |
| 4,378,006 | 3/1983 | Hawley . |
| 4,413,450 | 11/1983 | Brower ..................................... 52/27 |
| 4,993,583 | 2/1991 | Chasen ............................. 220/675 X |
| 5,048,707 | 9/1991 | Hallberg ........................... 220/671 X |
| 5,224,623 | 7/1993 | LaFleur ............................ 220/675 X |
| 5,454,538 | 10/1995 | Merideth ........................... 248/148 X |
| 5,570,864 | 11/1996 | Flores ................................... 248/148 |
| 5,584,147 | 12/1996 | Agee et al. ...................... 52/741.1 X |

FOREIGN PATENT DOCUMENTS

| | | |
|---|---|---|
| 0029180 | 5/1981 | European Pat. Off. . |
| 2364312 | 4/1978 | France . |
| 2463370 | 2/1981 | France . |
| 3346077 | 7/1985 | Germany . |
| 8902055 | 3/1989 | WIPO . |

*Primary Examiner*—Beth A. Stephan
*Assistant Examiner*—Brian E. Glessner
*Attorney, Agent, or Firm*—Webb Ziesenheim Logsdon Orkin & Hanson, P.C.

[57] ABSTRACT

The present invention relates to a device for supporting one or more solar panels or thermal collectors which may be arrangeable on a flat roof. The device has a bottom wall, a rear wall which extends upwardly from a rear side of the bottom wall, and two oppositely arranged side walls which are integrally joined with side edges of the bottom wall and rear wall. The side walls slope from the rear wall to a front edge of the bottom wall.

17 Claims, 4 Drawing Sheets

DEVICE FOR SUPPORTING SOLAR PANEL AND A SOLAR PANEL ASSEMBLY COMPRISING THIS DEVICE

BACKGROUND OF THE INVENTION

The present invention relates to a device for supporting one or more solar panels and/or thermal collectors, a solar panel assembly comprising this device and to a method for mounting one or more solar panels at a desired location, in particular on a flat roof of a building.

There is an increasing demand for the production of energy in an environmentally friendly manner.

The use of solar panels for transforming radiation energy from the sun into electrical energy is known. There are however practical problems involved in mounting such solar panels at a desired location.

An object of the present invention is to substantially obviate these problems.

SUMMARY OF THE INVENTION

According to a first aspect of the present invention there is provided a device for supporting one or more solar panels which are mountable on a surface, for example a flat roof, wherein the device comprises:

a bottom wall, a rear wall which extends upwardly from a rear side of the bottom wall, and two oppositely arranged side walls which are integrally joined with side edges of the bottom wall and side wall, wherein the side walls slope downwardly from the rear wall to a front edge of the bottom wall and wherein the device is made of plastic.

Since this device is lightweight, preferably weighing about 5 kg, and due to its functional design, the mounting time for mounting solar panels, especially on flat roofs, is drastically reduced with respect to the present mounting times. With the present invention it is for example possible to very simply manually arrange about 200 devices in a predetermined pattern on a flat roof in one day. This is contrary to the mounting of known, concrete solar panel supports wherein a complete day is often needed to arrange one support on a flat roof.

Furthermore transportation of devices according to the present invention is very simple since these are able to be stacked, whereby a large number can be transported by freight in one journey to a desired location.

Accordingly a predetermined number of devices according to the present invention can be very quickly and efficiently mounted at a desired location, thus providing a saving in man hours and costs.

Since the device according to the present invention only needs to be placed on a flat roof, further securing to the roof is not necessary whereby roof damage is kept to a minimum and complicated mounting profiles are not necessary.

The device according to the present invention is preferably made from recycled injection-moulded or vacuum-formed, chlorine-free polyethylene.

Injection-moulding and vacuum-forming provides an integral, independent device which is minimally harmful to the environment. The device also provides protection against UV radiation and the weather, and is also electrically insulating and can also be used as a cable channel.

The device furthermore has a long lifespan and requires little or no maintenance.

In order to efficiently support a solar panel, the upper walls of the rear wall and the side walls are preferably provided with nesting means which preferably take the form of a projecting lip part which preferably has a slightly larger circumference than that of a solar panel arrangeable on the device. Accordingly this lip part also functions as a buffer in order protect the solar panel against knocks and the like.

The device is preferably provided with securing means for securing a solar panel, which securing means can comprise screw holes. Accordingly a solar panel can be secured to the device by means of screws which extend through the solar panel in order to be screwed into the screw holes of the device.

The side walls of the device preferably extend from the rear wall to the front wall at an angle of roughly 25° with respect to the horizontal in order to arrange the solar panel in an optimum position for receiving the sun's radiation.

The device can have one or more air channels arranged in the walls thereof in order to effectively cool the solar panels in order to keep the efficiency thereof at a maximum.

The device can have one or more drainage openings which are preferably arranged under in the rear wall for the drainage of moisture or condensation which can accumulate within the device.

In order to provide a very stable support the device can be provided with reinforcing elements which elements preferably take the form of thickened ribs being integral with the walls.

Furthermore the device can comprise one or more spacers, for keeping the device at a predetermined distance from a flat roof for example whereby a good mounting position of the device is provided and whereby possible damage to a flat roof is further reduced.

According to a second aspect of the present invention there is provided an assembly, comprising the above device and a solar panel arranged thereon. The assembly preferably further comprises stabilizing means which can be arranged within the device for stabilizing thereof at a desired location, which stabilizing means can comprise a number of standard concrete elements such as concrete tiles for example or grit, sand or the like. Accordingly the stability of the assembly according to the present invention can be arranged according to the mounting location thereof.

According to another aspect of the present invention there is provided a method for mounting one or more solar panels on a flat roof comprising the following steps;

i) manually placing one or more of the above devices at a desired location in a predetermined pattern on a flat roof, and ii) mounting and securing of one or more solar panels on these devices.

BRIEF DESCRIPTION OF THE DRAWINGS

The present invention will now be further described with respect to the figures, wherein.

DETAILED DESCRIPTION OF THE INVENTION

Figure 1:
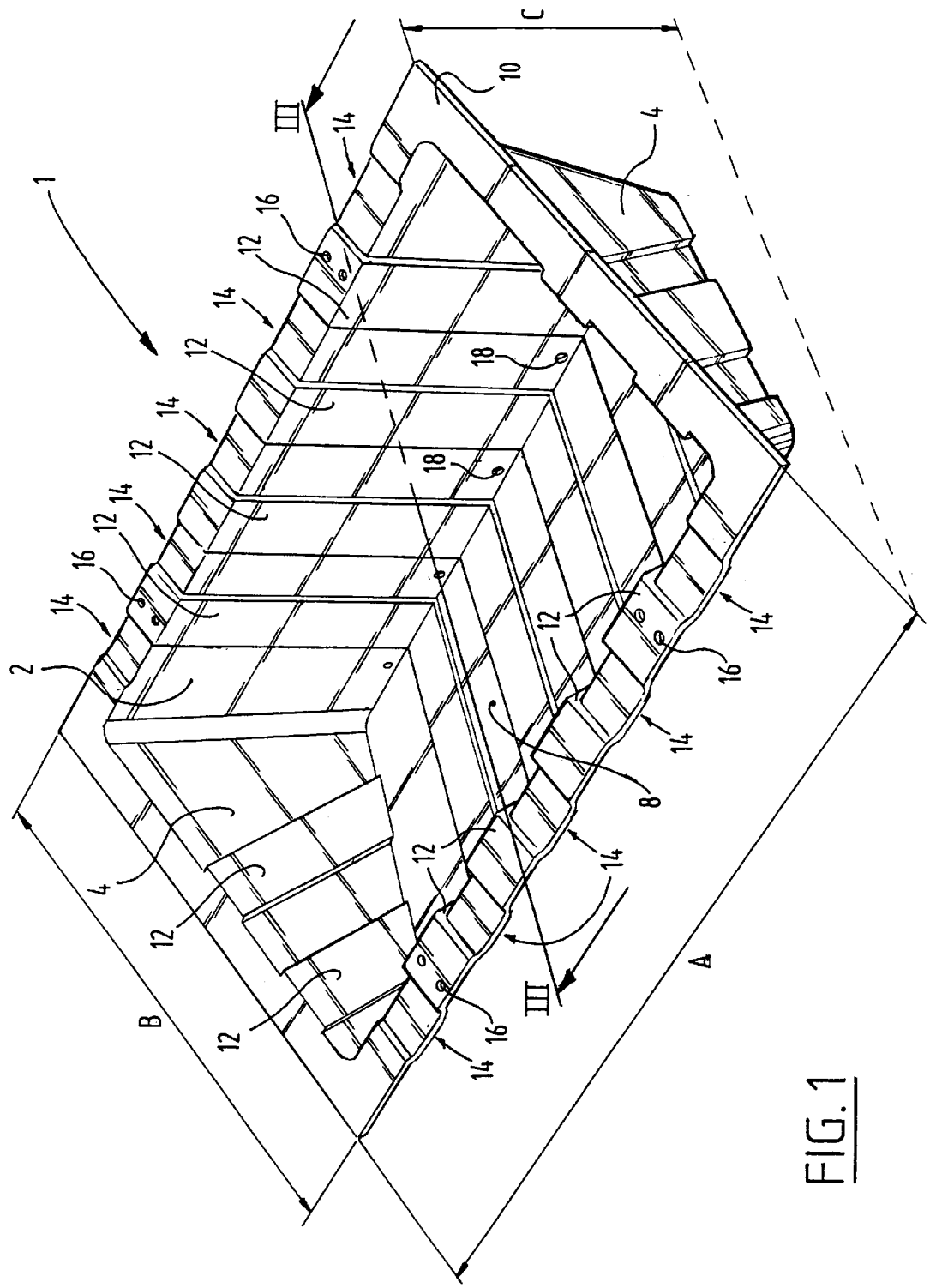
FIG. 1 shows a perspective view of a preferred embodiment of the device according to the present invention.

A device 1 (FIG. 1) according to the present invention comprises a rear wall 2, two side walls 4, a front wall 6 (see FIG. 2) and a bottom wall 8.

The upper edge of the rear wall 2, side walls 4 and the front wall 6 are turned out in order to form a lip part 10 which extends outwardly from these walls 2–6.

The side walls 4 extend from the rear wall 2 to the front wall 6 at an angle of approximately 25° with respect to the horizontal.

Reinforcing ribs 12 are arranged in the rear wall 2, the front wall 6 and the side walls 4 wherein these ribs may have a breadth of 110 mm with a spacing of 110 mm, a depth of 15 mm and make an angle of 5° with the rear and side walls.

Air channels 14 on the rear wall 2 and the front wall 6 are to be found between these reinforcing ribs 12.

Screw holes 16 extend through the outer reinforcing ribs 12 of both the rear wall 2 and the front wall 6 whereby a solar panel 24 (see FIG. 3) can be secured to the device.

Figure 2:
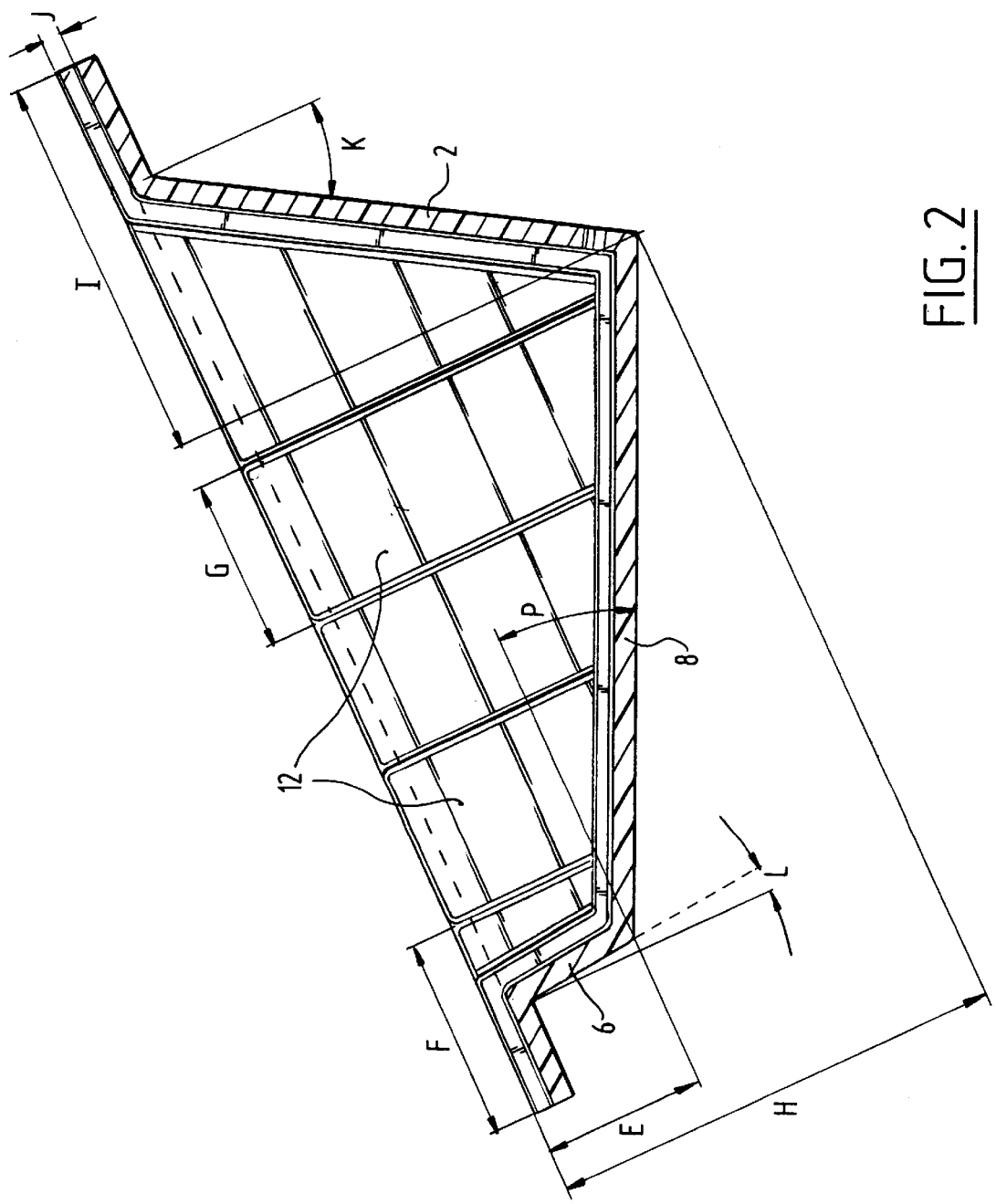
FIG. 2 shows a side view of the device from FIG. 1.

The dimensions of this preferred embodiment of the device 1 (are shown in FIGS. 1 and 2) are as follows.

A=1350 mm
B=730 mm
C=380 mm
D=110 mm
E=110 mm
F=135 mm
G=110 mm
H=300 mm
I=240 mm
J=15 mm
K=−30°
L=−5°

Condensation drainage openings 18 extend through the air channels 14 under in the rear wall 2.

Four assemblies 20 according to the present invention each comprise a device 1 from FIGS. 1 and 2 and a solar panel 24 arranged thereon. These assemblies are shown mounted on a flat roof.

Concrete blocks 22 are placed in the interior of the device 1 (see FIG. 3) in order to provide extra stability. This preferred embodiment of the device 1 according to the present invention weighs about 5 kg.

Although an assembly according to the present invention is very suitable for arranging on flat roofs, it will nevertheless be clear that such an assembly can also be arranged on sloping roofs.

The device according to the present invention is extremely suitable for supporting solar panels with dimensions of about 1.30×0.70 m², but the dimensions of the device according to the present invention can be chosen in order to support solar panels of other dimensions.

Figure 3:
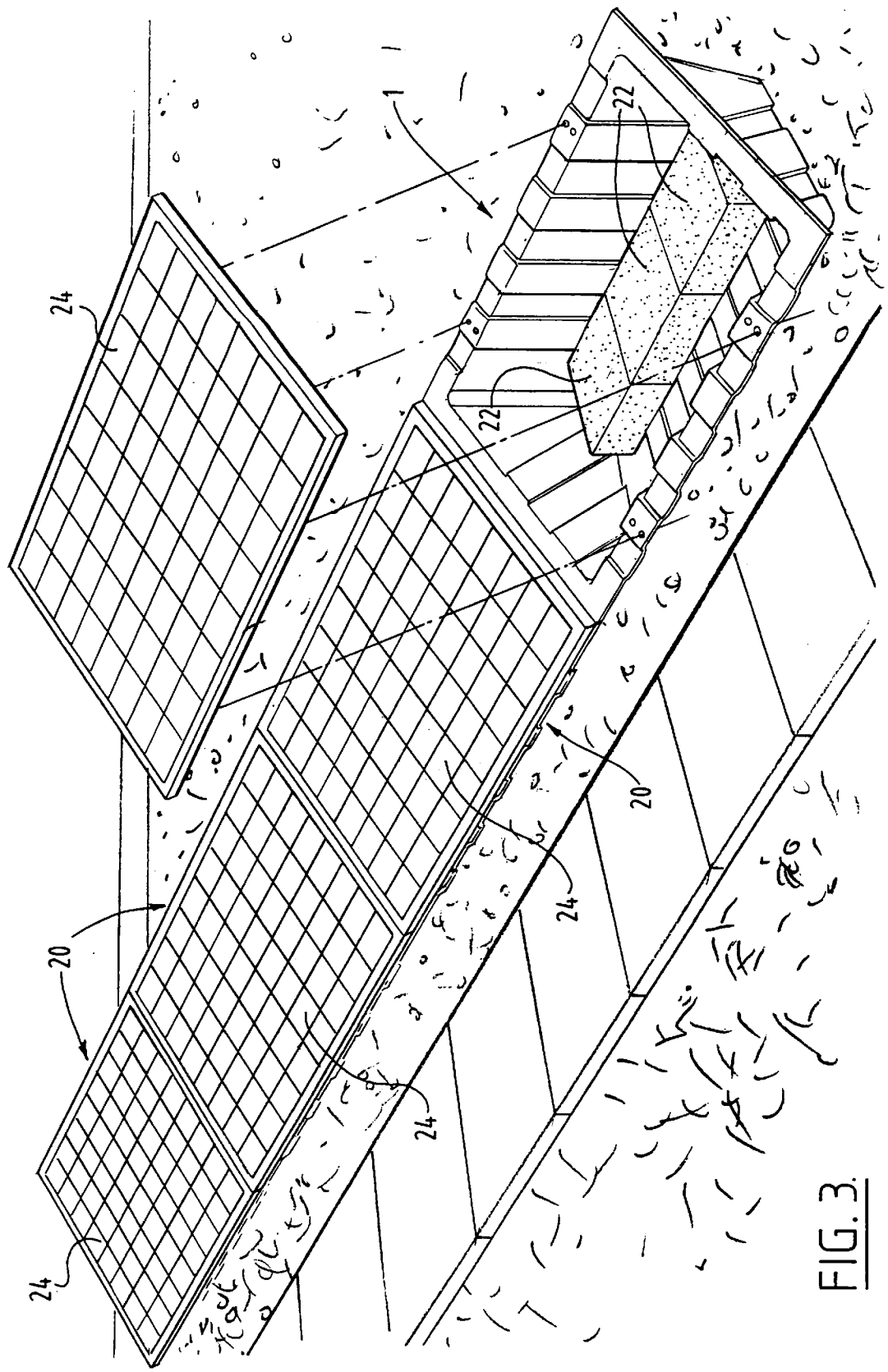
FIG. 3 shows four assemblies according to the present invention arranged on a flat roof.
Figure 4:
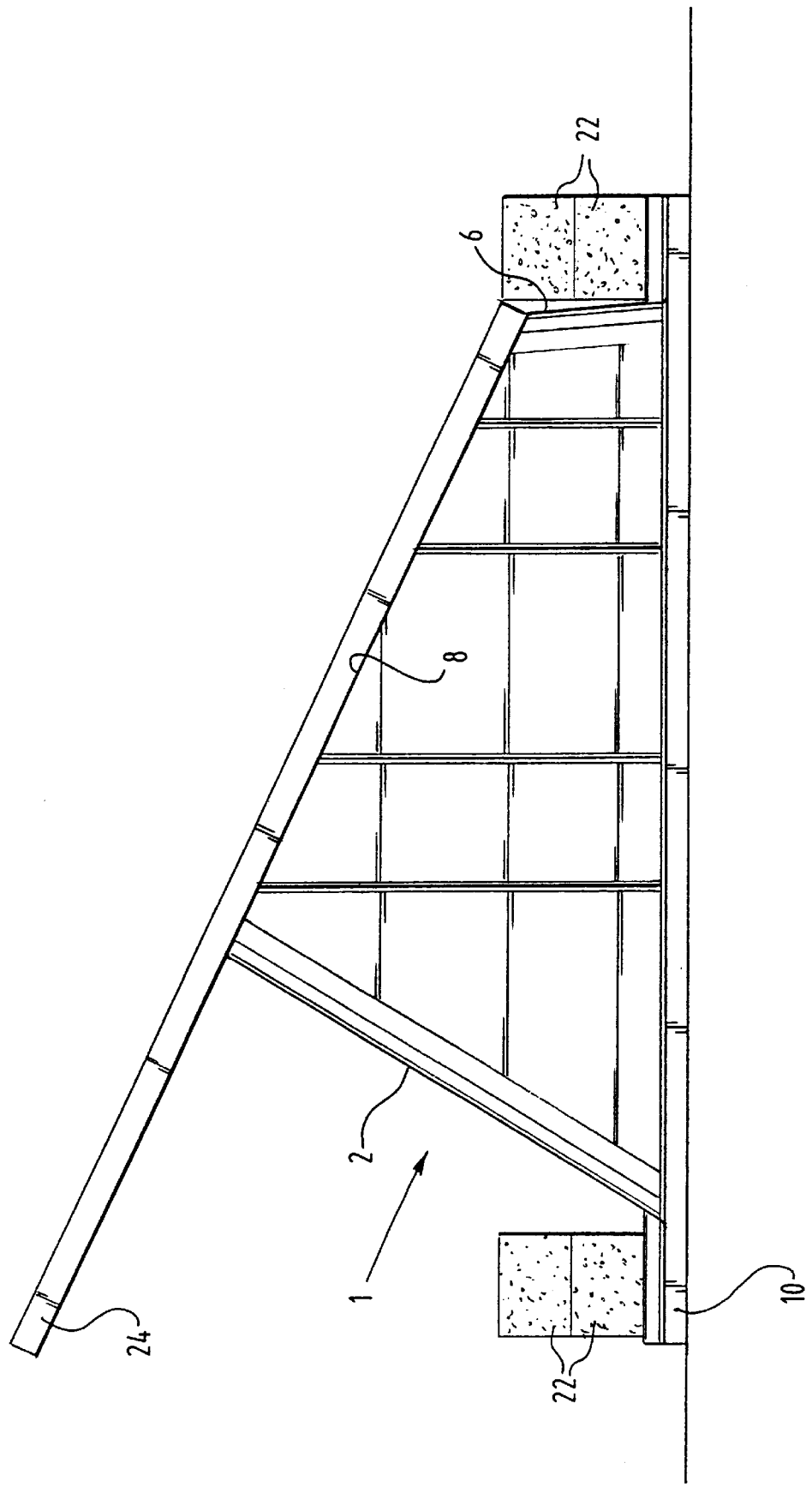
FIG. 4 shows a side view of a second embodiment of an assembly according to the present invention.

Instead of mounting solar panels in the manner as shown in FIG. 3, it is also possible to mount a solar panel or a thermal collector in the manner shown in FIG. 4. Here, the device 1 (FIGS. 1–3) is placed upside down whereby the lip part 10 makes direct contact with a flat roof and whereby the device 1 is stabilized by means of concrete elements 22 placed upon the lip part 10. In this embodiment, the solar panel 24 is mounted on the lower side of the bottom wall 8.

The present invention is not limited to the above described preferred embodiments, the requested rights are rather determined by the following claims.

What is claimed is:

1. A device for supporting one or more solar panels or thermal collectors, wherein the device comprises:
    a) a bottom wall,
    b) a rear wall which extends upwardly from and is integrally joined with a rear side of the bottom wall,
    c) two oppositely arranged side walls which are integrally joined with side edges of the bottom wall and rear wall, wherein the side walls slope forwardly and downwardly from the rear wall and are integrally joined with a front edge of the bottom wall,
    d) wherein the bottom wall, rear wall and side walls are a continuous form and provide a single integral part, and
    e) wherein the bottom wall is directly attached between the side walls.

2. The device according to claim 1, wherein the form is made of plastic and the plastic is injection-moulded or vacuum-formed from recycled polyethylene.

3. The device according to claim 1, wherein the upper edges of the rear and side walls are provided with nesting means for receiving a solar panel.

4. The device according to claim 3, wherein the nesting means comprise a lip part integrally joined with the upper edges of the rear and side walls.

5. The device according to claim 1, further comprising securing means for securing a solar panel.

6. The device according to claim 5, wherein the securing means comprise screw holes.

7. The device according to claim 1, wherein the side walls extend downwardly to a front wall at an angle of roughly 25° with respect to the horizontal.

8. The device according to claim 1, wherein one or more air channels are arranged in the walls.

9. The device according to claim 1, further comprising one or more drainage openings.

10. The device according to claim 1, further comprising reinforcing elements arranged in the walls.

11. An assembly comprising:
    a) a solar panel or thermal collector, and
    b) a device for supporting the solar panel or thermal collector wherein the device comprises a bottom wall, a rear wall which extends upwardly from and is integrally joined with a rear side of the bottom wall, two oppositely arranged side walls which are integrally joined with side edges of the bottom wall and rear wall, wherein the side walls slope forwardly and downwardly from the rear wall and are integrally joined with a front edge of the bottom wall, wherein the bottom wall, rear wall and side walls are a continuous form and provide a single integral part, wherein the bottom wall is directly attached between the side walls, and wherein the solar panel or thermal collector is mounted thereon.

12. The assembly according to claim 11, further comprising stabilizing means arranged in the device for stabilizing the assembly in position.

13. A method for arranging one or more solar panels or thermal collectors on a flat roof, comprising the steps of:
    a) manually placing one or more devices for supporting one or more solar panels or thermal collectors at a desired location on a flat roof in a predetermined pattern wherein each device comprises a bottom wall, a rear wall which extends upwardly from and is integrally joined with a rear side of the bottom wall, two oppositely arranged side walls which are integrally joined with side edges of the bottom wall and rear wall, wherein the side walls slope forwardly and downwardly from the rear wall and are integrally joined with a front edge of the bottom wall, wherein the bottom wall, rear wall and side walls are a continuous form and provide a single integral part, and wherein the bottom wall is directly attached between the side walls; and b) mounting and securing of one or mor solar panels or thermal collectors on the devices.

14. A device for supporting one or more solar panels or thermal collectors, wherein the device comprises:

a) a bottom wall, b) a rear wall which extends upwardly from a rear side of the bottom wall, c) two oppositely arranged side walls which are integrally joined with the side edges of the bottom wall and rear wall, wherein the side walls slope downwardly from the rear wall to a front edge of the bottom wall, wherein the device is made of plastic, and d) wherein one or more air channels are arranged in the walls.

15. The device according to claim 14, further comprising one or more drainage openings.

16. The device according to claim 14, further comprising reinforcing elements arranged in the walls.

17. The device according to claim 1, wherein the unitary form has a top which is open and has an interior contour and an exterior contour, and wherein the exterior contour conforms to the interior contour such that one device may be stacked within another device for transporting and storage.

* * * * *

UNITED STATES PATENT AND TRADEMARK OFFICE
CERTIFICATE OF CORRECTION

PATENT NO. : 6,105,316
DATED : August 22, 2000
INVENTOR(S) : Willem Otto Julius BÖTTGET et al.

It is certified that error appears in the above-identified patent and that said Letters Patent is hereby corrected as shown below:

Title Page [73] ASSIGNEE "Cooperatief" should read ---Coöperatief--.

Title Page [73] ASSIGNEE "Utrech" should read --Utrecht--.

Claim 13 Column 5 Line 3 "mor" should read --more--.

Signed and Sealed this

Twenty-fourth Day of April, 2001

Attest:

NICHOLAS P. GODICI

Attesting Officer

Acting Director of the United States Patent and Trademark Office